(12) United States Patent
Bishop

(10) Patent No.: US 9,290,133 B1
(45) Date of Patent: Mar. 22, 2016

(54) VEHICLE GARMENT HANGING DEVICE

(71) Applicant: Jerry W Bishop, Destin, FL (US)

(72) Inventor: Jerry W Bishop, Destin, FL (US)

( * ) Notice: Subject to any disclaimer, the term of this patent is extended or adjusted under 35 U.S.C. 154(b) by 0 days.

(21) Appl. No.: 14/285,708

(22) Filed: May 23, 2014

(51) Int. Cl.
| | | |
|---|---|---|
| *A47F 7/00* | (2006.01) | |
| *A47H 1/02* | (2006.01) | |
| *A47H 1/00* | (2006.01) | |
| *A47K 10/00* | (2006.01) | |
| *B60R 11/00* | (2006.01) | |
| *A47H 1/122* | (2006.01) | |
| *A47F 5/08* | (2006.01) | |
| *B60R 7/10* | (2006.01) | |
| *A47F 5/00* | (2006.01) | |
| *A47H 1/102* | (2006.01) | |
| *A47G 25/06* | (2006.01) | |

(52) U.S. Cl.
CPC .............. *B60R 11/00* (2013.01); *A47F 5/0006* (2013.01); *A47F 5/0884* (2013.01); *A47G 25/0692* (2013.01); *A47H 1/02* (2013.01); *A47H 1/102* (2013.01); *A47H 1/122* (2013.01); *B60R 7/10* (2013.01); *B60R 2011/008* (2013.01); *B60R 2011/0019* (2013.01)

(58) Field of Classification Search
CPC ............ B60R 11/00; B60R 2011/0019; B60R 2011/008; B60R 7/10; B60R 7/005; B60R 7/04; B60R 7/043; B60R 7/046; B60R 7/05; B60R 7/06; B60R 7/08; B60R 7/12; B60R 7/14; A47H 1/02; A47H 1/102; A47H 1/122; A47H 1/142; A47H 1/022; A47H 1/03; A47H 1/10; A47H 1/12; A47H 1/14; A47H 2001/006; A47H 2001/0215; A47G 25/0692; A47G 25/746; A47G 25/1478; A47G 25/743; A47G 27/06; A47G 25/14; A47F 5/0884; A47F 5/0006; A47F 2005/0012; A47F 7/143; A47F 5/08; A47F 5/0892; B65D 85/185; A47K 10/04; A47K 10/10; A47K 10/18; A47B 61/003; A47B 43/003; A47B 43/006; A47B 61/02; D06F 57/12
USPC ............... 211/89.01, 85.3, 105.1–105.6, 123, 211/124, 118, 113, 119.004, 119.011, 175, 211/193, 106.01; 248/690, 693, 301, 304, 248/339; 224/405, 482, 313, 322, 311, 927
See application file for complete search history.

(56) References Cited

U.S. PATENT DOCUMENTS

| | | | | |
|---|---|---|---|---|
| 2,548,992 | A | * 4/1951 | McPherson | .................... 224/550 |
| 2,609,936 | A | * 9/1952 | Gust | ........................... 211/105.1 |
| D181,237 | S | 10/1957 | Spielman | |
| 2,969,881 | A | * 1/1961 | Lilly | ........................... 211/105.3 |
| 3,002,666 | A | 10/1961 | Silverman | |
| 3,119,496 | A | * 1/1964 | Burk | ........................... 211/105.1 |
| 3,386,589 | A | 6/1968 | Prete, Jr. | |
| 3,424,314 | A | * 1/1969 | Cornelsen | ................... 211/105.3 |
| 3,481,483 | A | * 12/1969 | Hil et al. | .................... 211/105.3 |

(Continued)

*Primary Examiner* — Jennifer E Novosad
(74) *Attorney, Agent, or Firm* — Peter Loffler

(57) ABSTRACT

A device is removably secured within a vehicle and allows multiple hangers to be properly positioned on the device for clothing transport. The device uses a bar member, either of fixed length or telescoping, such that a loop is positioned at a selected position along the length of the bar member. The loop is hung on either a hook or a grab bar of the vehicle such that an end of the bar member abuts the side of the vehicle proximate the hook or bar and thereby provides load support for the device with the loop acting as a fulcrum. The bar extends a short distance into the passenger compartment and the hangers are hung on the bar member on the passenger compartment side of the loop.

2 Claims, 5 Drawing Sheets

(56) References Cited

U.S. PATENT DOCUMENTS

| | | | | |
|---|---|---|---|---|
| 3,606,711 | A | * | 9/1971 | Lodato ............... 52/27 |
| 3,708,093 | A | | 1/1973 | Toms, II |
| 4,111,309 | A | * | 9/1978 | Henry ............... 211/104 |
| 4,155,465 | A | * | 5/1979 | Baublitz ............... 211/123 |
| 4,360,109 | A | * | 11/1982 | Kurtz ............... 211/100 |
| 4,494,896 | A | * | 1/1985 | DiFranco ............... 410/148 |
| 4,523,701 | A | * | 6/1985 | Armbruster ............... 223/94 |
| 4,645,106 | A | * | 2/1987 | Pawl ............... 224/313 |
| 4,771,899 | A | * | 9/1988 | Benedict et al. ............... 211/60.1 |
| 4,778,089 | A | | 10/1988 | White et al. |
| 4,863,081 | A | * | 9/1989 | Gabbert ............... 224/550 |
| 5,014,954 | A | * | 5/1991 | Merl ............... 248/285.1 |
| D323,284 | S | | 1/1992 | Thompson |
| 5,104,083 | A | | 4/1992 | Shannon |
| 5,328,068 | A | * | 7/1994 | Shannon ............... 224/558 |
| 5,332,108 | A | * | 7/1994 | Blass ............... 211/90.02 |
| 5,749,505 | A | * | 5/1998 | Reyes ............... 224/482 |
| 6,131,638 | A | * | 10/2000 | Levin ............... 160/80 |
| 2002/0153337 | A1 | * | 10/2002 | Shuen ............... 211/123 |
| 2005/0199567 | A1 | * | 9/2005 | Tardiff ............... 211/105.3 |
| 2006/0243764 | A1 | * | 11/2006 | Chiang ............... 223/85 |
| 2008/0156837 | A1 | | 7/2008 | Brightman |
| 2010/0044403 | A1 | * | 2/2010 | Humphreys ............... 223/88 |

* cited by examiner

VEHICLE GARMENT HANGING DEVICE

BACKGROUND OF THE INVENTION

1. Field of the Invention

The present invention relates to a device that removably attaches to a garment hook or a passenger grab bar within a vehicle, such that clothes on a hanger can be supported from the device.

2. Background of the Prior Art

Many people want to take clothes with them when traveling by vehicle. A person may want to take a business suit in the vehicle to change into after a workout at the gym or take more formal clothes for a social function after work when there is not enough time to go home and change. Such situations tend not to be problematic as the person simply places the desired clothes onto a hanger and the hanger is hung from the hook located in the vehicle for such purpose, typically in the back seat area of the passenger compartment, or absent such a hook, from the passenger grab bar. When the clothing is desired, the hanger is removed from the hook or grab bar and the job is finished.

Problems arise when multiple items of clothing need to be transported, such as when a person is going on a weekend getaway and does not want to fold his or her clothes into a suitcase or on the back seat or a person is simply picking up multiple freshly cleaned and pressed items from the dry cleaners. Typically the hook can support one or at best two hangers which may prove too little capacity for a person with multiple items of clothing on hangers. While a grab bar may support more than a couple of hangers, placement of multiple items of clothing on multiple hangers onto a grab bar tends to scrunch the clothing items together, often wrinkling them so that the clothing items do not fare any better than being laid on the back seat of the vehicle.

One way to overcome this problem is the use of a hanger rod that stretches between the interior sides of the vehicle, the hanger rod being a tension bar that is supported against the sides of the vehicle via the biasing of the hanger bar's internal springs. The hanger bar is capable of carrying a substantial number of clothing items allowing the items to remain separated during the journey so as to reduce the risk of wrinkling and folding of the items. While effective, the hanger bar is not without problems. One problem with the hanger bar is that depending on the slope of the interior side wall of the vehicle, the tension bar may not get a sufficient grip on the side walls and be prone to slippage, especially if the clothing load is large. Additionally, many drivers simply get distracted by a bar that is positioned across the rear window of the vehicle. Further, depending on the architecture of the vehicle, the hanger bar must be positioned so as to leave no room for rear seat passengers.

To address these hanger bar problems, devices have been proposed that are located on one side of the vehicle and extend out a relatively short distance from the side wall (which includes the lower section of the roof line), which distance is sufficient to be able to hold sufficient clothing items for most people's needs. As such devices only protrude a short distance from a vehicle's interior side wall, they tend to not unduly distract the driver of the vehicle and do not rob back seat passengers of their seating real estate.

However, these prior art devices also have their shortcomings. Many of the devices are relatively complex in design and construction so as to be cost-prohibitive to produce so as to be economically unattractive to the average consumer. Some devices require elaborate installation, often with the attendant requirement of the need to make a permanent alteration to the vehicle, which many vehicle owners are unwilling to undertake. Still some devices have only a single point of support, that being at the attachment of the device to the vehicle hook, so that relatively heavy clothing loads cannot be supported by such devices.

What is needed is a device that allows a person to be able to hang multiple clothing items, separated from one another, within a vehicle, which device overcomes the above stated shortcoming found in the art. Specifically, such a device must not stretch across the entire vehicle passenger compartment so as to not be distractive to the driver of the vehicle and so as to not prevent passengers from occupying the back seat of the vehicle. Such a device must be relatively simple in design and construction and must be easy to install into and remove from the vehicle without the need to make permanent alterations to the vehicle. The device must be able to support a relatively heavy clothing load.

SUMMARY OF THE INVENTION

The vehicle garment hanging device of the present invention addresses the aforementioned needs in the art by providing a device that quickly and easily hangs in the passenger compartment of a vehicle and holds multiple items of clothing in a manner so as to prevent such clothing items from becoming wrinkled. The vehicle garment hanging device is supported on a single side of the vehicle so as to not be an undue distraction to the driver and so as not to make the back seat area uninhabitable by passengers. The vehicle garment hanging device is of relatively simple design and construction, being produced using standard manufacturing techniques, so as to be economically attractive to potential consumers for this type of product. Installation of the vehicle garment hanging device within the vehicle is quick, does not require any tools, and does not require any alterations, permanent or temporary, to be made to the vehicle. The vehicle garment hanging device can be supported from either the vehicle's garment hook or from the vehicle's grab bar and has dual points of load support so that a relatively heavy clothing load can be placed onto the device.

The vehicle garment hanging device is comprised of a bar member that has a first end, an opposing second end, and a medial section therebetween. The bar member also has an upper surface. A loop member is pivotally attached to the bar member. Positioning means are provided for selectively positioning the loop member along a portion of the medial section (between the first end and the second end) of the bar member. A lip is radially located on the upper surface of the bar member proximate the second end. A series of spaced apart grooves are radially located on the upper surface of the bar member. The top of the loop may be hooked for grab bar attachment. The positioning means may comprise a plurality of first openings located on the bar member and longitudinally spaced apart from one another and a pin that is attached to a first end of loop and that passes through a respective one of the first openings and through a respective one of one or more second openings located on a second end of the loop. Alternately, the position means comprises a main slot that is longitudinally disposed within the bar member (extends between the first end and the second end) and a series of loop slots that extend upwardly from the main slot such that the loop slides within the main slot and placed into a desired respective one of the loop slots. Alternately, the bar member is comprised of a first section slidably disposed within a second section thereby making the bar member telescoping so that the positioning means comprises a plurality of first opening pairs located on the first section of the bar member longitudinally spaced apart from one another and a plurality of second opening pairs located on the second section of the bar member longitudinally spaced apart from one another. A pin is attached to a first end of loop. The first section and the second section are positioned with respect to one another such a respective one of the first opening pairs and a respective one of the second opening pairs are aligned with one another and the pin passes through the aligned first opening pairs and second opening pairs and through a respective one of one or more third openings located on a second end of the loop.

BRIEF DESCRIPTION OF THE DRAWINGS

Similar reference numerals refer to similar parts throughout the several views of the drawings.

DESCRIPTION OF THE PREFERRED EMBODIMENT

Figure 1:
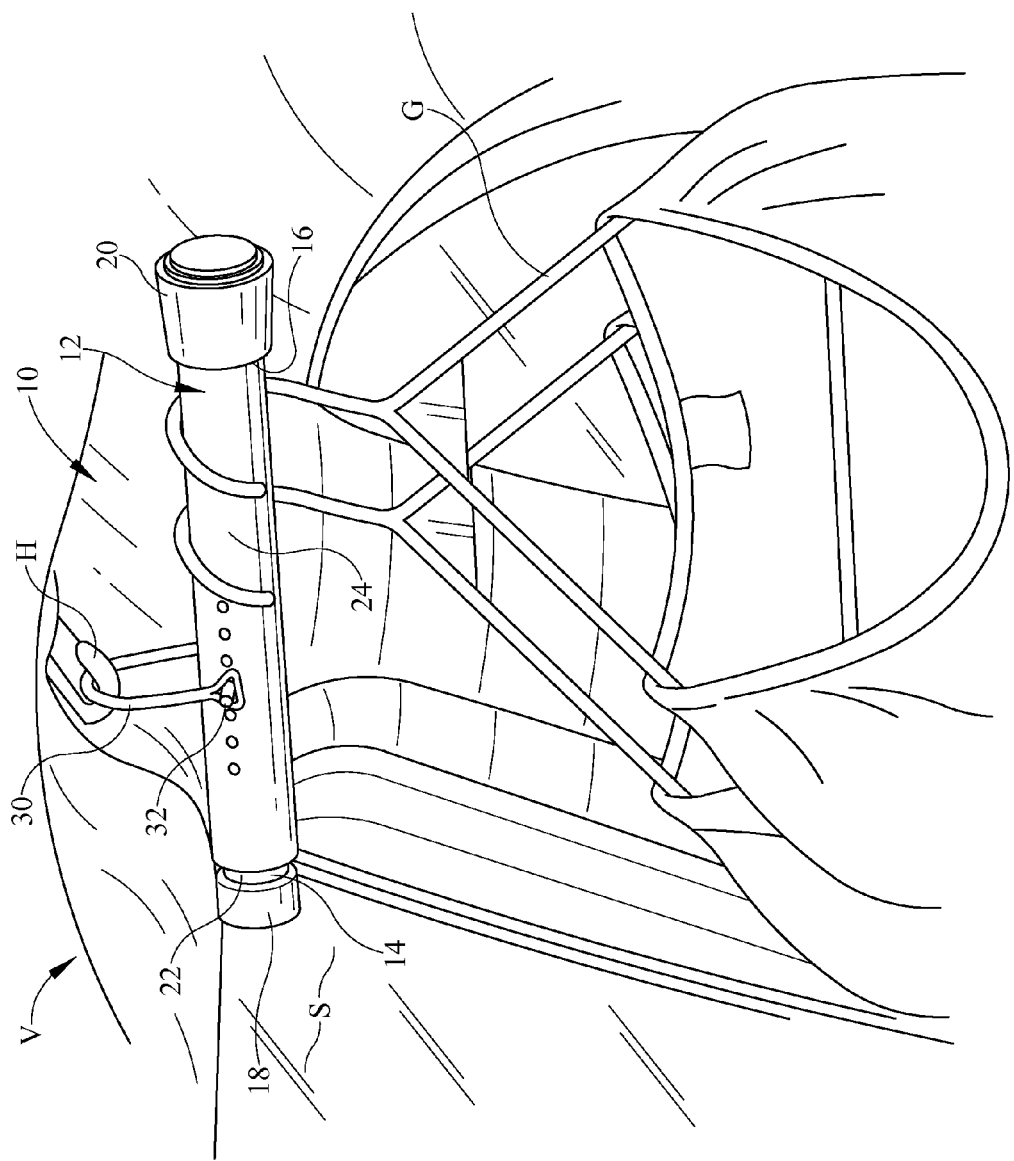
FIG. 1 is an environmental view of the vehicle garment hanging device of the present invention installed within a vehicle, the vehicle garment hanging device capable of telescoping.
Figure 2:
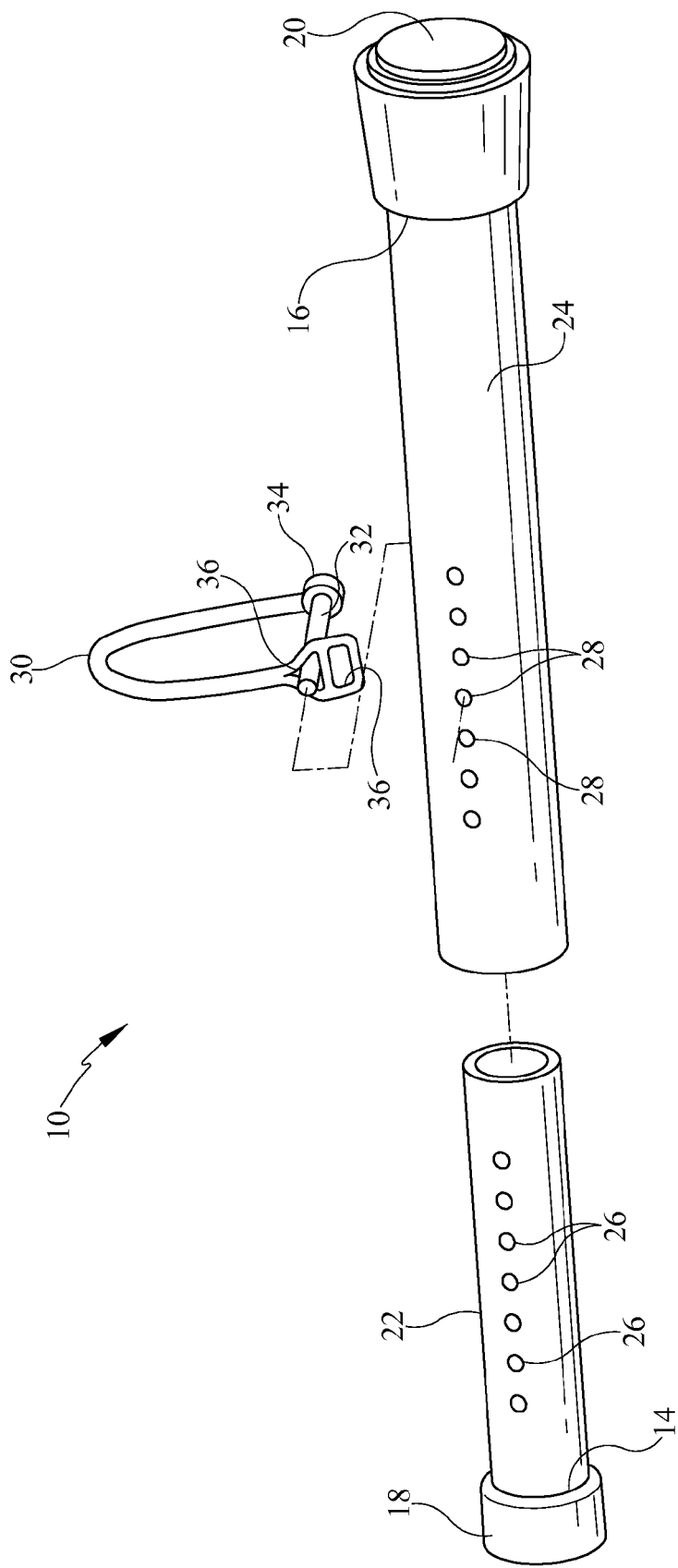
FIG. 2 is a perspective view, partially exploded, of the telescoping version of the vehicle garment hanging device.

Referring now to the drawings, and particularly FIGS. 1 and 2, it is seen that the vehicle garment hanging device of the present invention, generally denoted by reference numeral 10, is comprised of a an elongate bar member 12, which may be made from any appropriate material, such as PVC, etc., that has a first end 14 and a second end 16. A first cap 18 may be located on the first end 14 and a second cap 20 may be located on the second end 16. As seen, the bar member 12 may be comprised of a first section 22 that is slidably received within a second section 24 so as to make the bar member 12 telescoping. The first section 22 has a first set of opening pairs 26 while the second section 24 has a corresponding second set of opening pairs 28 such that the bar member 12 is adjusted to its desired length such that at least one set of first opening pairs 26 and one set of second opening pairs align with one another and a pin 32 is inserted the desired aligned opening pairs 26 and 28—the particular second opening pairs 28 selected based on the desired position of a loop 30 as described below—and the respective one first opening pairs 26 that align with the second pair of openings 28 at this desired length of bar member 12 telescoping so that the first end 14 of the bar member appropriately abuts the side (or roof line) S of the vehicle V as more fully described below. As seen, the pin 32 may be attached, either removably or fixedly to a first end 34 of the loop 34 and passes through an opening 36 on the second end of the loop 30 in order to secure the hook 30 at the desired position along the length of the bar member 12. The loop 30, which may be made from a flexible plastic, metal (possibly plastic or rubber coated), etc., may be of fixed length, or as seen in FIG. 2, one or more additional openings 36 can be provided on the second end of the hook 30 so that the pin 32 passes through the desired opening 36 based on the desired size of the loop 30.

In order to use the vehicle garment hanging device 10 of the present invention, the bar member 12 is adjusted to its desired length, the specific length selected based on the distance from the loop 30 acting as a fulcrum to the side S of the vehicle V to which the first end 14 abuts. The specific position of the loop 30 is also selected and the pin 32 is inserted through the appropriate aligned first pair of openings 26 and second pair of openings 28 and the loop 30 is hooked onto the hook H of the vehicle V within which the vehicle garment hanging device 10 is supported. The position of the loop 30 along the length of the bar member 12 is selected based on the architecture of the vehicle V. The loop 30 is positioned so that the first end 14 of the bar member abuts against the side S of the vehicle V, which, depending on the vehicle V can be a window, a door pillar, bottom of the roof line, etc., such abutment providing overall load support for the bar member 12 as the bar member 12 extends approximately horizontally or slightly tilted upwardly (from first end 14 to second end 16) into a portion of the passenger compartment of the vehicle V, the loop 30 pivotally attached to the bar member 12, acts as a fulcrum. As the clothes laden hangers G are placed onto the bar member 12 between the loop 30 and the second end 16 of the bar member 12, the bar member 12 pivots about the loop 30 so that the first end 14 of the bar member 12 is pushed up into the side S of the vehicle V in order to steady the bar member 12. The first side 14 of the bar member 12, with or without cap 18, may be angled to better help the first end 14 abut the side S of the vehicle V. The first cap 18, if used, helps cushion the first end 14 of the bar member 12 against the vehicle and protects against scuffs or tears. The second cap 20 helps prevent any hangers G supported on the bar member 12 from sliding off.

Figure 3:
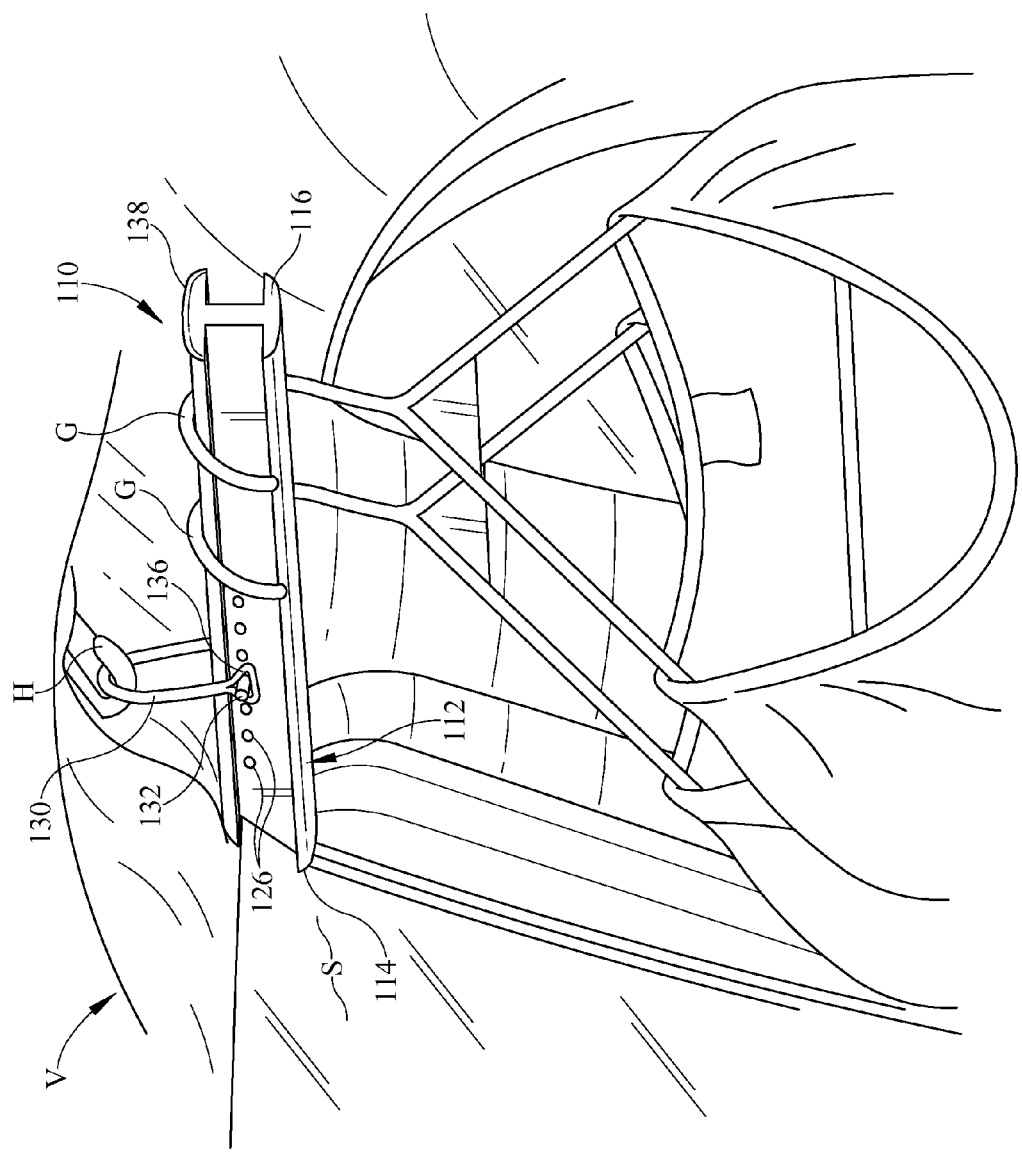
FIG. 3 is an environmental view of the vehicle garment hanging device installed in a vehicle without a telescoping feature.

As seen in FIG. 3, in an alternate embodiment of the vehicle garment hanging device 110 of the present invention, a bar member 112 is a single unitary item, still having a first end 114 and a second end 116. As seen a small lip 138 is located on the second end 116 of the bar member 112 in lieu of a cap, such lip 138 helping prevent hangers G from sliding off of the second end 116—it being understood that the first embodiment of the vehicle garment hanging device 10 may have such a lip in lieu of the second cap 20. This embodiment of the vehicle garment hanging device 110 has a single series of openings 126—this embodiment is in the shape of an I-beam, which simplifies manufacture, but may be a tubular member (or other shape) similar to the first embodiment of the vehicle garment hanging device 10, in which case, this embodiment would have a single set of corresponding opening pairs. A loop 130 is located at the desired length along the bar member 112 and a pin 132 is attached, either fixedly or removably, to a first end (not illustrated, but substantially identical to the loop 30 of the first embodiment of the vehicle garment hanging device 10) and passes through the desired opening 126 of the body member 112, the pin 132 received within an opening 136 on the second end of the loop 130—this embodiment may also feature multiple openings 136 on this second end of the loop 130. Once the loop 130 is secured to the body member 112, the loop 130 is hung from the hook H of the vehicle V, again such that the first end 114 of the bar member 112 abuts the side S of the vehicle V in order to provide overall load support for the bar member 112 as the bar member 112 extends approximately horizontally or slightly tilted upwardly (from the first end 114 to the second end 116) into a portion of the passenger compartment of the vehicle V, the loop 130 pivotally attached to the bar member 112, acts as a fulcrum. As the clothes laden hangers G are placed onto the bar member 112 between the loop 130 and the second end 116 of the bar member 112, the bar member 112 pivots about the loop 130 so that the first end 114 of the bar member 112 is pushed up into the side S of the vehicle V in order to steady the bar member 112. The first side 114 of the bar member 112, with or without cap, may be angled to better help the first end 114 abut the side S of the vehicle V. The bar member 112 and the loop 130, including pin 132, may be made from similar materials used to form the bar member 12 and the loop 30 of the first embodiment of the vehicle garment hanging device 10.

Figure 4:
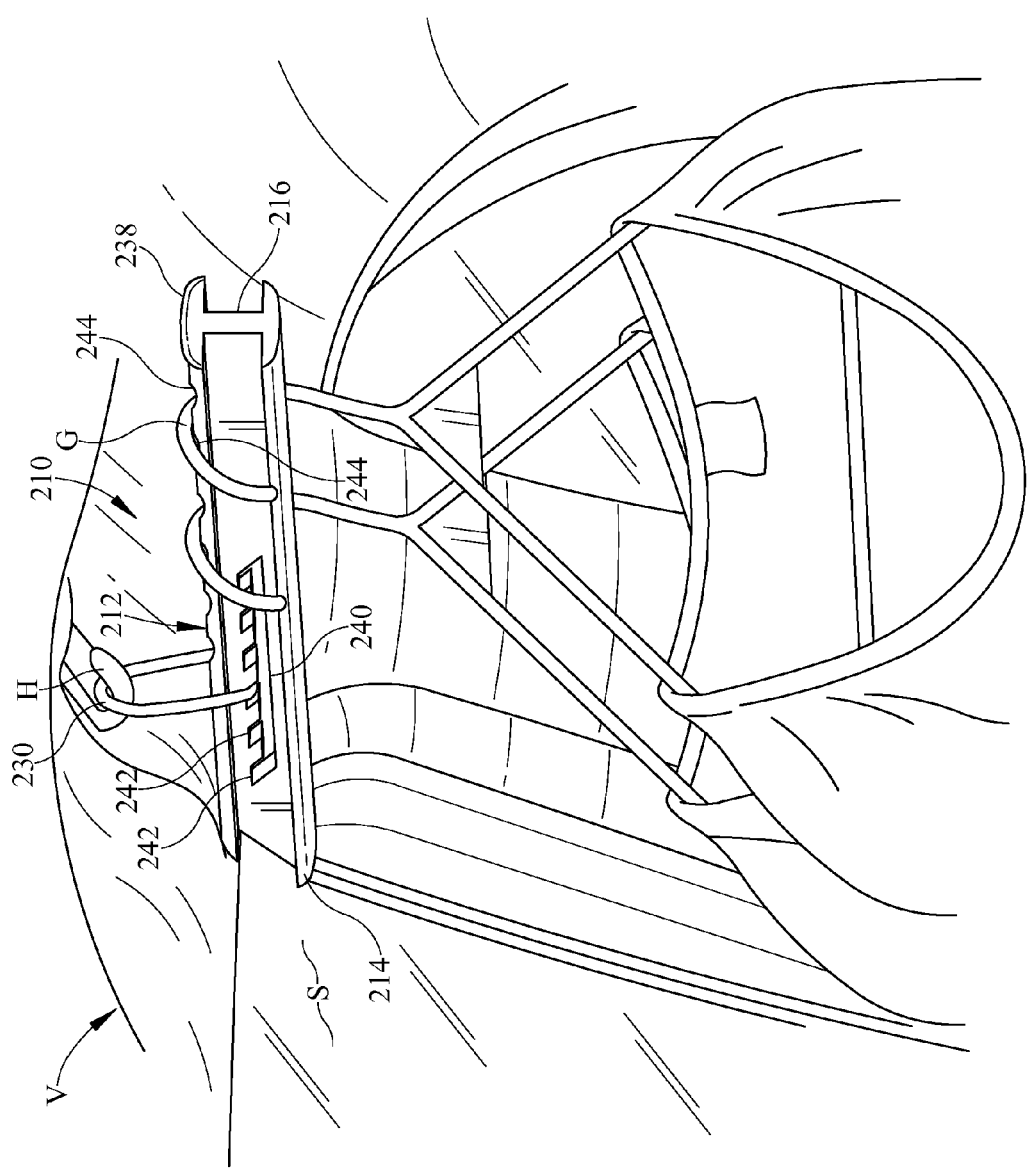
FIG. 4 is an environmental view of the vehicle garment hanging device installed within a vehicle using a sliding hook positioning mechanism.

As seen in FIG. 4, in a second alternate embodiment of the vehicle garment hanging device 210 of the present invention, a bar member 212 is a single unitary item, still having a first end 214 and a second end 216 and either a small lip 238 located on the second end 216 of the bar member 212 or a cap (not illustrated) in order to help prevent hangers G from sliding off of the second end 216. This embodiment of the vehicle garment hanging device 210 has a main slot 240 running longitudinally along a portion of the body 212 of the vehicle garment hanging device 210 and a series of loop slots 242 extending upwardly from the main slot 240, possibly angled slightly toward the first end 214 of the bar member 212. A loop 230, which is a continuous loop member is located within the slot structure and is positioned at the desired length along the bar member 212 by sliding the loop 230 within the main slot 240 and thereafter positioning the loop 230 within the desired loop slot 242 for the desired position. The loop 230 can be formed by threading the loop 230 within the slot structure (the loop being an elongate member at this point) and thereafter bringing the two ends of the loop together and either squeezing the two ends together into abutting relationship, crimping the two ends, securing the two ends together in appropriate fashion (soldering, hot welding, adhesive, etc.). Alternately, the main slot may open all the way to the first end of the bar member and the loop 230 can be slid into the main slot thereat. Once the loop 230 is secured to the body member 212, the loop 230 is hung from the hook H of the vehicle V, again such that the first end 214 of the bar member 212 abuts the side S of the vehicle V in order to provide overall load support for the bar member 212 as the bar member 212 extends approximately horizontally or slightly tilted upwardly (from the first end 214 to the second end 216) into a portion of the passenger compartment of the vehicle V, the loop 230 pivotally attached to the bar member 212, acts as a fulcrum. As the clothes laden hangers G are placed onto the bar member 212 between the loop 230 and the second end 216 of the bar member 212, the bar member 212 pivots about the loop 230 so that the first end 214 of the bar member 212 is pushed up into the side S of the vehicle V in order to steady the bar member 212. The first side 214 of the bar member 212, with or without cap, may be angled to better help the first end 214 abut the side S of the vehicle V. The bar member 212 and the loop 230 may be made from similar materials used to form the bar member 12 and the loop 30 of the first embodiment of the vehicle garment hanging device 10. As seen, a series of slots 244 may be located on an upper surface of the bar member 212, such slots 244 receiving the upper hooked end of a hanger G in order to help stabilize the hanger G at that position. Such slots may also be located on the first embodiment and the second embodiment of the vehicle garment hanging device.

Figure 5:
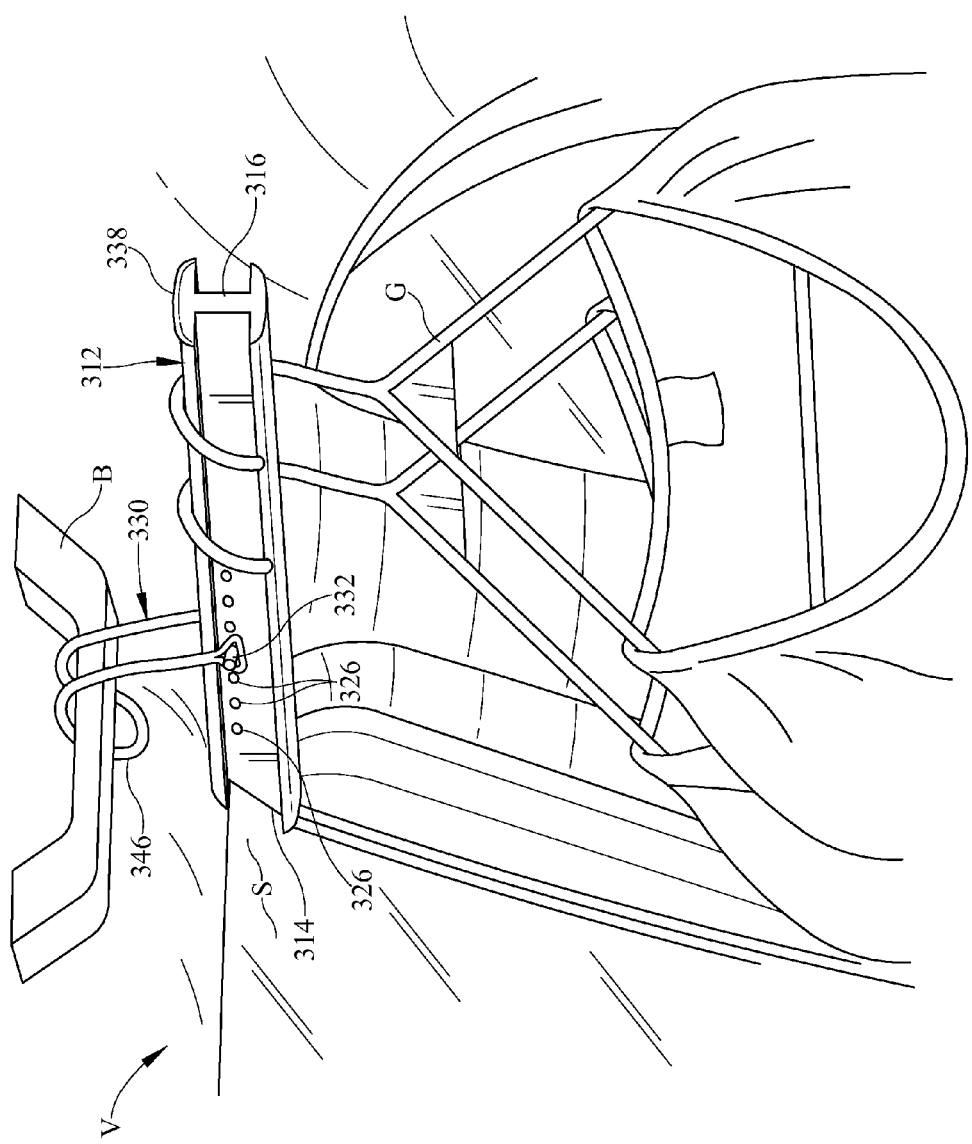
FIG. 5 is an environmental view of the vehicle garment hanging device installed on a grab bar of the vehicle.

As seen in FIG. 5, a loop 330 is provided and may be attached to its bar member 312 in either fashion, such as the illustrated pin 332 passing through an appropriate opening 326 or opening pair (in the case of a tubular bar member or a telescoping bar member (dual opening pairs)) or via the slot system described for the second embodiment of the vehicle garment hanging device 210, such that the loop 330 has a hooked top 346, so that the hooked top 346 is hooked onto a grab bar B of the vehicle V instead of the hook H and supported thereon. In such a version of the loop 330, the position of the hook 330 is still selected so that the first end 314 of the bar member 312 abuts against the side S of the vehicle V in order to provide load support for the bar member 312 as the bar member 312 extends approximately horizontally or slightly tilted upwardly (from the first end 314 to the second end 316) into a portion of the passenger compartment of the vehicle V. Hangers G are positioned on the bar member 312 in appropriate fashion and may still be kept from sliding off of the second end 316 via a small lip 338 and may also have radial slots (not illustrated). Any of the embodiments of the vehicle garment hanging device may use a loop that has a hooked end so that the particular embodiment can be hung from the grab bar B instead of the hook H of the vehicle. If the hook is removably attachable to its respective body member, then one hook type can be swapped out for another hook type depending on the situation.

While the invention has been particularly shown and described with reference to an embodiment thereof, it will be appreciated by those skilled in the art that various changes in form and detail may be made without departing from the spirit and scope of the invention.

I claim:

1. A support device comprising:
    a bar member having a first end, an opposing second end, and a medial section therebetween, the bar member also having an upper surface, the bar member comprised of a first section slidably disposed within a second section thereby making the bar member telescoping;
    a loop member pivotally attached to the bar member;
    a plurality of first opening pairs located on the first section of the bar member longitudinally spaced apart from one another;
    a plurality of second opening pairs located on the second section of the bar member longitudinally spaced apart from one another;
    a pin that is attached to a third end of the loop member; and
    wherein the first section and the second section are positioned with respect to one another such that a respective one of the first opening pairs and a respective one of the second opening pairs are aligned with one another and the pin passes through the aligned first opening pair and second opening pair and through a third opening located on a fourth end of the loop member.

2. The support device as in claim 1 wherein a top of the loop member is hooked.

* * * * *